(12) United States Patent
Khasnabish

(10) Patent No.: US 9,699,222 B2
(45) Date of Patent: Jul. 4, 2017

(54) METHOD AND SYSTEM FOR IMPLEMENTING INTEGRATED VOICE OVER INTERNET PROTOCOL IN A CLOUD-BASED NETWORK

(71) Applicants: ZTE CORPORATION, Shenzhen (CN); ZTE (USA) Inc., Austin, TX (US)

(72) Inventor: Bhumip Khasnabish, Lexington, MA (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/797,938

(22) Filed: Jul. 13, 2015

(65) Prior Publication Data

US 2015/0358367 A1    Dec. 10, 2015

Related U.S. Application Data

(63) Continuation of application No. 13/577,021, filed as application No. PCT/US2011/024901 on Feb. 15, 2011, now Pat. No. 9,112,880.
(Continued)

(51) Int. Cl.
*H04L 12/28* (2006.01)
*H04L 29/06* (2006.01)
*F03D 7/06* (2006.01)

(52) U.S. Cl.
CPC ........ *H04L 65/105* (2013.01); *H04L 65/1053* (2013.01); *F03D 7/06* (2013.01)

(58) Field of Classification Search
CPC .............. H04L 65/102; H04L 65/1013; H04L 65/1043; H04L 65/1046; H04L 65/105; H04L 65/1063
See application file for complete search history.

(56) References Cited

U.S. PATENT DOCUMENTS 6,496,477 B1    12/2002  Perkins et al.
7,123,598 B1    10/2006  Chaskar
(Continued)

FOREIGN PATENT DOCUMENTS

JP    11-112503 A    4/1999
JP    2003-229893 A    8/2003
(Continued)

OTHER PUBLICATIONS

English Translation of Japanese Office Action for patent application No. P2015-125846, dated Jun. 28, 2016.
(Continued)

*Primary Examiner* — Kevin C Harper
(74) *Attorney, Agent, or Firm* — Drinker Biddle & Reath LLP

(57) ABSTRACT

A system for implementing VoIP over a cloud-based network includes a first edge proxy server operatively connected to a plurality of target proxy servers to receive resource information from one or more of the target proxy servers. Each target proxy server is associated with the cloud-based network. A first endpoint is operatively connected to the first edge proxy server and is configured for voice communications with a second endpoint. The voice communications are facilitated by the first edge proxy server using the received resource information.

16 Claims, 2 Drawing Sheets

Related U.S. Application Data

(60) Provisional application No. 61/304,642, filed on Feb. 15, 2010.

(56) References Cited

U.S. PATENT DOCUMENTS

| | | |
|---|---|---|
| 7,418,092 B2 | 8/2008 | Brown |
| 2002/0018521 A1* | 2/2002 | Sherlock ............... H04M 11/062 375/222 |
| 2002/0178269 A1 | 11/2002 | Suckow |
| 2004/0006615 A1 | 1/2004 | Jackson |
| 2005/0027788 A1 | 2/2005 | Koopmans et al. |
| 2005/0091399 A1 | 4/2005 | Candan et al. |
| 2006/0007914 A1 | 1/2006 | Chandra et al. |
| 2006/0026288 A1 | 2/2006 | Acharya et al. |
| 2006/0123470 A1 | 6/2006 | Chen |
| 2006/0182255 A1* | 8/2006 | Luck, Jr. ................. H04M 3/12 379/220.01 |
| 2007/0140262 A1 | 6/2007 | Wang |
| 2008/0091811 A1 | 4/2008 | Wing et al. |
| 2008/0253390 A1 | 10/2008 | Das et al. |
| 2009/0040923 A1 | 2/2009 | Bantukul et al. |
| 2010/0062787 A1 | 3/2010 | Yoshiuchi et al. |

FOREIGN PATENT DOCUMENTS

| | | |
|---|---|---|
| JP | 2007-235556 A | 9/2007 |
| WO | WO-2008/105106 A1 | 9/2008 |

OTHER PUBLICATIONS

Buyya, R., et al., "Cloud computing and ermerging IT platforms: Vision, hype, and reality for delivering computing as the 5th utility", Future Generations Computer Systems, Elsevier Science Publishers, XP026033513, 2009, vol. 25, No. 6, pp. 599-616.

Gouveia, F., et al., "Cloud computing and EPC / IMS integration: new value-added services on demand", Proceedings Of The 5th International Mobile Multimedia Communications Conference, XP055073528, 2009, pp. 1-5.

Supplementary European Search Report for application No. EP 11 74 3005, dated Apr. 20, 2017.

* cited by examiner

METHOD AND SYSTEM FOR IMPLEMENTING INTEGRATED VOICE OVER INTERNET PROTOCOL IN A CLOUD-BASED NETWORK

RELATED APPLICATIONS

This application is a continuation application of U.S. patent application Ser. No. 13/577,021, filed Sep. 13, 2012, which is a national stage application (under 35 U.S.C. §371) of PCT/US2011/024901, filed Feb. 15, 2011, which claims priority to U.S. Provisional Patent Application No. 61/304,642, filed Feb. 15, 2010, the disclosure of which is incorporated herein by reference in its entirety.

PRIORITY

Priority is claimed to U.S. Provisional Patent Application No. 60/304,642, filed Feb. 15, 2010, the disclosure of which is incorporated herein by reference in its entirety.

FIELD OF THE INVENTION

The field of the present invention is cloud-based communication networks, particularly cloud-based networks in which sessions may be established and controlled from a software-based or hardware-based communication terminal.

BACKGROUND

By way of non-limiting example only, a cloud-based system refers to a network of connected computing and communication resources. A cloud-based system may represent a packet-switched network, like the Internet. The network may contain transmission lines, repeaters, routers, network backbones, network interconnect points, etc., depending upon the extent of the network which it represents. Voice over Internet Protocol ("VoIP") is a general term for a family of transmission technologies for delivery of voice communications over Internet Protocol ("IP") networks such as the Internet or other packet-switched networks.

When establishing a VoIP session over a traditional Time Division Multiplex ("TDM") or IP based communication system, a client or endpoint (irrespective of whether it is hardware or software based) configures and registers itself with a specific service or provider. For example, a Skype™ user downloads a Skype™ client on a laptop or on a phone, and registers for the services. A TDM based system uses an E.164 based phone number to make a phone call. However, if a service does not exist for any reason (e.g. overload, disaster, etc.), a VoIP session may not be established.

Accordingly, there is a need to support computing and communications services using the available resources of a cloud-based system without any significant investments for building and maintenance of networks, storage, servers, network management, operations, and provisioning systems.

SUMMARY OF THE INVENTION

The present invention is directed toward systems and methods for establishing and controlling a session over cloud-based networks from a software or hardware based communication terminal.

In a first aspect of the present invention, a system for implementing VoIP over a cloud-based network comprises a first edge proxy server operatively connected to target servers, and receives resource information from the target servers, which are associated with the cloud-based network. A first endpoint is operatively connected to the first edge proxy server and is configured for voice communications with a second endpoint over the cloud-based network. The system also includes a second endpoint operatively connected to a second edge proxy server. The first and second endpoints are configured for voice communications over the cloud-based network. The voice communications are facilitated by the first edge proxy server using the received resource information.

In a second aspect of the present invention, a first edge proxy server receives resource information from one or more target proxy servers associated with a cloud-based network, wherein the first edge proxy server is registered with a first endpoint. Based at least in part on the received resource information, the first edge proxy server facilitates voice communications with a second endpoint over the cloud based network.

Any of the above aspects may be implemented alone or in combination.

Additional aspects and advantages of the improvements will appear from the description of the preferred embodiment.

BRIEF DESCRIPTION OF THE DRAWINGS

Embodiments of the present invention are illustrated by way of the accompanying drawings, in which.

DETAILED DESCRIPTION OF THE PREFERRED EMBODIMENTS

Figure 1:
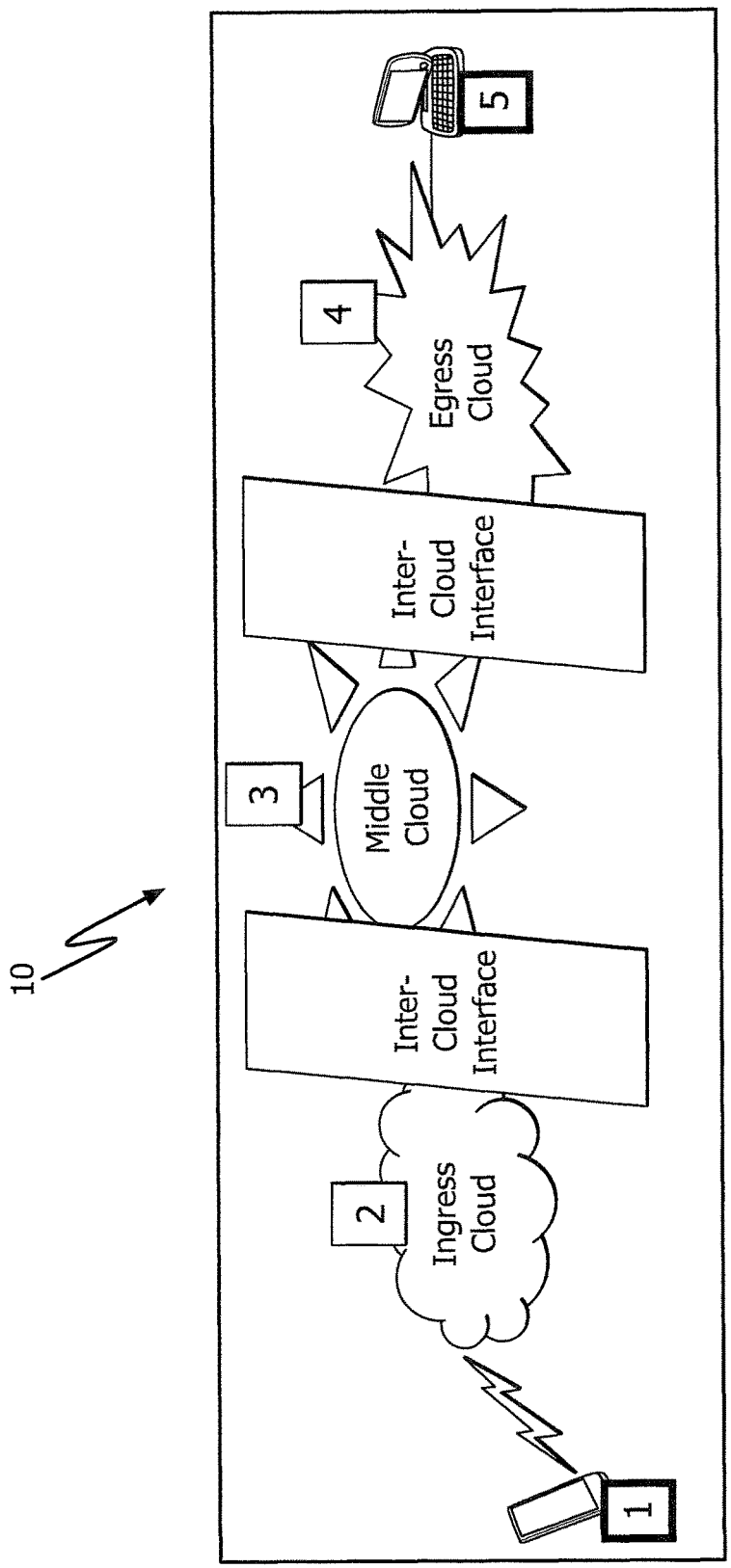
FIG. 1 illustrates a block diagram of an integrated VoIP over cloud-based network in which a session may be controlled from a communication terminal.

Referring now to FIG. 1, there is shown a block diagram of a system 10. The illustrated system 10 includes iVoCS ("integrated VoIP over Cloud-based System") endpoints 1 and 5, an ingress edge proxy server (not shown) located in an ingress cloud 2, a target proxy server (not shown) located in a middle cloud 3, and an egress edge proxy server (not shown) located in an egress cloud 4. An iVoCS endpoint, as used herein, refers to a particular contact point, an associated VoIP device, and a unique VoIP client identifier. The contact point refers to, for example, an individual, organization, or company. The edge proxy servers may include middleware. The middleware keeps track of the best possible server for the desired service, and frequently downloads information about the server's availability to endpoints of the system. For example, every minute (or any other predetermined time interval), the middleware downloads information about the server's availability, loading condition, and other characteristics to the endpoints. In the event the endpoints are powered down, the edge proxy servers update the endpoints with the server information when the endpoints are subsequently powered up.

Inter-cloud interfaces facilitate exchanges of resources and the resource availability information to and/or from all the clouds, 2, 3, and 4, of which they are attached. If the middle cloud 3 belongs to an administrative domain as the respective inter-cloud interface, the inter-cloud interfaces will be null. However, if the middle cloud 3 belongs to a different administrative domain; security, policy, and load balancing features must be properly managed across the inter-cloud interfaces. For purposes of non-limiting explanation only, an administrative domain refers to a network domain having authority to manage or control users with internal components of that domain.

For non-limiting purposes of explanation only, a "computer", as referred to herein, refers to a general purpose computing device that includes a processor. "Processor", as used herein, refers generally to a device including a Central Processing Unit ("CPU"), such as a microprocessor. A CPU generally includes an arithmetic logic unit ("ALU"), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips. Memory may take the form of one or more random-access memory ("RAM"), read-only memory ("ROM"), programmable read-only memory ("PROM"), erasable programmable read-only memory ("EPROM"), or electrically erasable programmable read-only memory ("EEPROM") chips. Memory may be internal or external to an integrated unit including the processor. Memory may be internal or external to the computer. Such memory may store a computer program, e.g., code or a sequence of instructions being operable by the processor. Such a computer may include one or more data inputs. Such a computer may include one or more data outputs. The code stored in memory may cause the processor, when executed by the processor, to set an output to a value responsive to a sensed input.

One type of computer executable code typically stored in memory so as to be executable by an Internet enabled computer is a browser application. For non-limiting purposes of explanation only, "browser" as used herein generally refers to computer executable code used to locate and display web pages. Two commercially available browsers are Microsoft Internet Explorer, Netscape Navigator, Apple Safari and Firefox, which all support text, graphics and multimedia information, including sound and video (sometimes through browser plug-in applications).

"Server", as used herein, generally refers to a computing device communicatively coupled to a network and that manages network resources. A server may refer to a discrete computing device, or may refer to an application that is managing resources rather than the entire computing device. An edge proxy server may be a proxy server which is designed to run at the edge of the network, e.g., separating a local network from the Internet.

Figure 2:
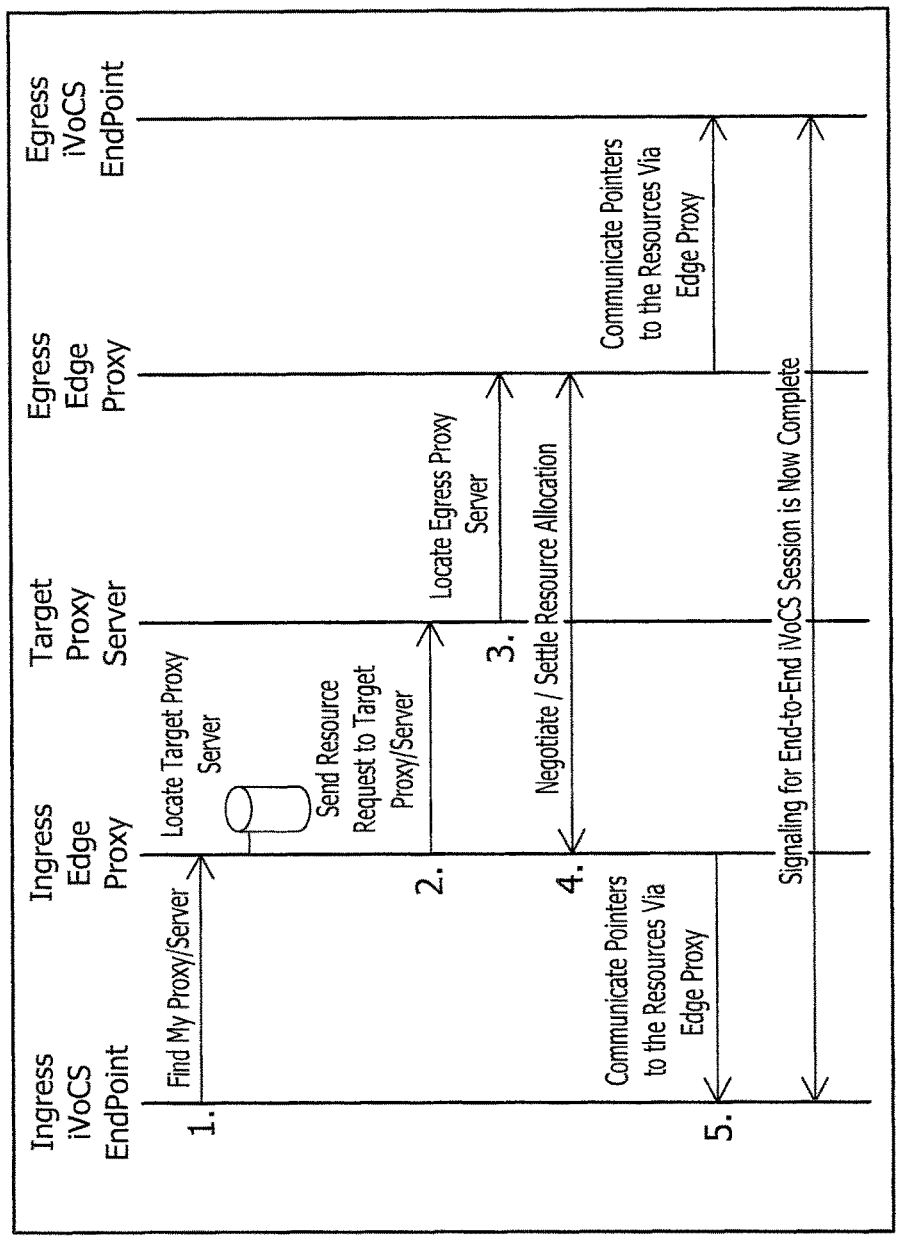
FIG. 2 illustrates a signaling method for establishing a session in an integrated VoIP over cloud-based network.

Referring now to FIG. 2, there is shown a diagram illustrating the steps of a signaling method for establishing an iVoCS session. In step 1, ingress and egress iVoCS endpoints establish communication with ingress and egress edge proxy servers, respectively, for session and non-session based services. In step 2, the ingress edge proxy server locates a target proxy server. In step 3, the ingress edge proxy server locates, via the target proxy server, the egress edge proxy server. In step 4, both the ingress edge proxy server and the egress edge proxy server identify the most feasible resources for requested sessions, and then finalize the resource allocation. The ingress and egress edge proxies also identify and assign resources in a middle cloud. In step 5, the ingress and egress edge proxies communicate the resource information to the iVoCS endpoints. A resource list is continuously monitored, and overloaded resources are relinquished if/when required. Media paths, translation and routing paths, if/when desired may be established in a similar fashion as the steps described above. Sub-application and sub-session layer inter-cloud resource allocation and communications may also follow methods as described in FIG. 2.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A system for communicating over a cloud-based network between first and second endpoints, the system comprising:
an ingress edge proxy server of an ingress cloud operatively coupled to the first endpoint;
a first target proxy server of a middle cloud in a different administrative domain than the ingress cloud, the first target proxy server configured to receive information from resources under its control as identified first target resources, and operatively coupled to the ingress edge proxy server via a first intercloud interface;
an egress edge proxy server of an egress cloud in a different administrative domain than the ingress cloud and the middle cloud, the egress proxy server operatively coupled to the first target proxy server via a second intercloud interface, and operatively coupled to the second endpoint; and
a second target proxy server in one of the ingress, the middle, or the egress cloud and operatively coupled to one of the ingress or egress edge proxy servers and configured to receive information from resources under its control as identified second target resources;
wherein:
the edge proxy servers are configured to receive the information of the identified first and second target resources from the first and second target proxy servers respectively;
the edge proxy servers include middleware that identifies, allocates, and keeps track of the best identified first and second target resources for a plurality of services; and
the edge proxy servers download at respective predetermined intervals information of the tracked resources' characteristics to the first and second endpoints including at least the tracked resources' availability and loading condition; and
in the event an endpoint is decoupled from its edge proxy server and subsequently recoupled to an edge proxy server, the recoupling edge proxy server updates the recoupled endpoint with updated tracked resources information; and
the intercloud interfaces facilitate exchanges of the identified resource information and resource availability and loading information to and from the clouds to which they are attached; and
security, policy, and load balancing functions of the target proxy servers in the different administrative domains are managed by the middleware across the inter-cloud interfaces.

2. The system of claim 1, wherein the communication comprises a voice over IP (VoIP) communication.

3. The system of claim 1, wherein the at least one of the edge proxy servers establishes the route based on at least one parameter of the resource information.

4. The system of claim 2, wherein the identified cloud-based network resources are monitored by at least one of the first and second edge proxy servers to update its resource information.

5. The system of claim 4, wherein the updated resource information is used by one of the edge proxy servers to modify the route.

6. The system of claim 5, wherein the first and second edge proxy servers are both configured to independently monitor network resources for the communication, update its respective resource information, and modify at least one of the route and the resources allocated based on at least one parameter of its updated resource information.

7. The system of claim 4, wherein the first and second edge proxy servers each comprise middleware, wherein the middleware uses the information received from the target proxy servers to keep track of the best target proxy servers to use to obtain the resources needed for the communication and the route for the communication, and regularly downloads information about those target proxy servers to the first and second endpoints of the system, including at least the target proxy servers' availability and loading condition.

8. The system of claim 4, wherein in the event one of the endpoints decouples from its edge proxy server and subsequently recouples to its edge proxy server, its edge proxy server updates that endpoint's target proxy server information.

9. A method for communicating over a cloud-based network (cloud) between first and second endpoints, comprising:
   operatively coupling an ingress edge proxy server of an ingress cloud to the first endpoint;
   operatively coupling a target proxy server of a middle cloud to the ingress edge proxy server via a first intercloud interface, and operatively coupling the target proxy server to an egress edge proxy server of an egress cloud via a second intercloud interface; and
   operatively coupling the egress edge proxy server to the second endpoint; wherein:
      the edge proxy servers include middleware that identifies and keeps track of the best server for a desired service, and downloads at predetermined intervals information of the tracked server's characteristics to the first and second endpoints including at least the tracked server's availability and loading condition;
      in the event an endpoint is decoupled from its edge server and subsequently recoupled to its respective ingress or egress cloud via the same or a different edge server, the recoupling edge proxy server provides the recoupled endpoint with updated tracked server information;
      the intercloud interfaces facilitate exchanges of resources and respective resource availability information to or from ones of the clouds to which they are respectively attached; and
      at least two of the ingress cloud, the middle cloud, and the egress cloud are in different administrative domains, and security, policy, and load balancing functions of the servers in the different administrative domains are managed by the middleware across the inter-cloud interfaces.

10. The method of claim 9, wherein the communication comprises a voice over IP (VoIP) communication.

11. The method of claim 9, wherein at least one of the edge proxy servers establishes the route using at least one parameter of the resource information it has received.

12. The method of claim 9, wherein the resources allocated for the communication between the first and second endpoints are monitored by at least one of the first and second edge proxy servers to update its resource information.

13. The method of claim 12, wherein the updated resource information is used by one of the edge proxy servers to modify the route.

14. The method of claim 13, wherein the first and second edge proxy servers are both configured to independently monitor network resources for the communication, and update its respective resource information, and modify at least one of the route and the resources allocated based on at least one parameter of its updated resource information.

15. The method of claim 9, wherein the first and second edge proxy servers each comprise middleware that uses the information received from the target proxy servers to keep track of the best target proxy servers to use to obtain the resources needed for the communication and the route for the communication, and regularly downloads information about those target proxy servers to the first and second endpoints of the system, including at least their the target proxy servers' availability and loading condition.

16. The method of claim 9, wherein in the event one of the endpoints decouples from its edge proxy server and subsequently recouples to its edge proxy server, its edge proxy server updates that endpoint's target proxy server information.

* * * * *